US010630936B2

(12) United States Patent
Chen

(10) Patent No.: US 10,630,936 B2
(45) Date of Patent: Apr. 21, 2020

(54) METHODS TO TRANSMIT VIDEO OVER MIMO CHANNEL

(71) Applicant: Shidong Chen, Chongqing (CN)

(72) Inventor: Shidong Chen, Chongqing (CN)

( * ) Notice: Subject to any disclaimer, the term of this patent is extended or adjusted under 35 U.S.C. 154(b) by 0 days.

(21) Appl. No.: 16/332,306

(22) PCT Filed: Sep. 11, 2017

(86) PCT No.: PCT/CN2017/101185
§ 371 (c)(1),
(2) Date: Mar. 11, 2019

(87) PCT Pub. No.: WO2018/046004
PCT Pub. Date: Mar. 15, 2018

(65) Prior Publication Data
US 2019/0208164 A1    Jul. 4, 2019

Related U.S. Application Data

(60) Provisional application No. 62/393,124, filed on Sep. 12, 2016.

(51) Int. Cl.
*H04N 7/12* (2006.01)
*H04L 29/06* (2006.01)
(Continued)

(52) U.S. Cl.
CPC .............. *H04N 7/12* (2013.01); *H04L 29/06* (2013.01); *H04N 11/044* (2013.01);
(Continued)

(58) Field of Classification Search
None
See application file for complete search history.

(56) References Cited

U.S. PATENT DOCUMENTS

2007/0098063 A1* 5/2007 Reznic ................. H04N 11/044
375/240.2
2007/0115797 A1* 5/2007 Reznic .................... G06T 9/007
370/203
(Continued)

FOREIGN PATENT DOCUMENTS

| CN | 1518812 A | 8/2004 |
|---|---|---|
| CN | 1701556 A | 11/2005 |

(Continued)

OTHER PUBLICATIONS

Jiubo Liu, "The application of an improved adaptive loading algorithms in MIMO/OFDM", Jilin University, Master Thesis, Oct. 15, 2005.

(Continued)

*Primary Examiner* — Reza Aghevli
(74) *Attorney, Agent, or Firm* — Novick, Kim & Lee, PLLC; Allen Xue

(57) ABSTRACT

Provided in the present invention is a method for transmitting a video using quasi-continuous modulation by means of a multi-input multi-output (MIMO) channel, comprising the following steps: de-correlating a source video by means of video prediction encoding and multi-dimensional transformation so as to generate a transformation domain video residual coefficient; mapping the transformation domain video residual coefficient in parallel into one or more transmission streams by means of a sub-carrier or sub-channel optimized sorting; modulating the transmission streams in parallel into a plurality of emission output signals by means of linear normalization and quasi-continuous modulation; and emitting the plurality of emission output signals in parallel to an MIMO channel by means of a plurality of antennas or cable drivers.

23 Claims, 4 Drawing Sheets

(51) Int. Cl.
  *H04N 11/04* (2006.01)
  *H04N 11/24* (2006.01)
  *H04N 19/103* (2014.01)
  *H04N 19/176* (2014.01)
  *H04N 19/18* (2014.01)
  *H04N 19/61* (2014.01)

(52) U.S. Cl.
  CPC ........... *H04N 11/24* (2019.01); *H04N 19/103* (2014.11); *H04N 19/176* (2014.11); *H04N 19/18* (2014.11); *H04N 19/619* (2014.11)

(56) References Cited

U.S. PATENT DOCUMENTS

| | | | | |
|---|---|---|---|---|
| 2007/0274381 | A1* | 11/2007 | Li | H04B 1/66 375/240.01 |
| 2009/0003485 | A1* | 1/2009 | Li | H04B 7/0413 375/299 |
| 2009/0154698 | A1* | 6/2009 | Chen | H04N 7/167 380/240 |
| 2009/0161755 | A1* | 6/2009 | Gordon | H04N 7/1675 375/240.02 |
| 2009/0168896 | A1* | 7/2009 | Gordon | H04N 7/16 375/240.25 |
| 2010/0315964 | A1* | 12/2010 | Kim | H04L 45/121 370/252 |
| 2010/0315997 | A1* | 12/2010 | Kim | H04N 21/43615 370/328 |
| 2010/0319037 | A1* | 12/2010 | Kim | H04N 21/2383 725/81 |
| 2015/0131720 | A1* | 5/2015 | Luo | H04B 7/0671 375/240.12 |
| 2015/0350595 | A1* | 12/2015 | Chen | H04N 7/0155 348/724 |

FOREIGN PATENT DOCUMENTS

| | | | | |
|---|---|---|---|---|
| CN | 1909525 | A | | 2/2007 |
| CN | 101494774 | A * | 7/2009 | ............... H04N 7/24 |
| CN | 103945246 | A * | 7/2014 | ........... H04N 21/266 |
| CN | 103997474 | A | | 8/2014 |
| CN | 104092643 | A * | 10/2014 | ............. H04L 27/34 |
| CN | 104104690 | A * | 10/2014 | ............. H04L 29/06 |
| CN | 104104690 | A | | 10/2014 |
| CN | 104994055 | A | | 10/2015 |
| EP | 0912021 | A2 | | 4/1999 |
| EP | 2525538 | A2 | | 11/2012 |
| WO | 2013170763 | A1 | | 11/2013 |
| WO | 2013170766 | A1 | | 11/2013 |

OTHER PUBLICATIONS

Qianlei Liu, "Signal detection algorithms for MIMO communication systems", Southeast University, PHD Thesis, Jul. 15, 2007.

* cited by examiner

METHODS TO TRANSMIT VIDEO OVER MIMO CHANNEL

BACKGROUND OF THE INVENTION

Field of Invention

The present invention relates to the video transmission for video surveillance systems, broadcasting systems, machine vision systems, virtual reality systems, augmented reality systems and other video-based systems.

Background

Video transmission is a fundamental component and function in many systems and applications. In a typical video surveillance system, multiple cameras are connected with one video recorder via a cable network. Each camera transmits at least a video to the video recorder over the connecting cable. The video recorder often displays the camera videos instantly to monitor the live scenes in the field of view of the cameras, records the camera videos and plays back the recordings. In a machine vision application such as a machine vision-based autonomous vehicle, one, a pair of or more cameras are installed and each transmits a live video to the machine video processor, which combines the live videos and generates 2-dimensional (2D), 3-dimensional (3D), or surround machine visions of the live field.

Historically, video transmission system started in uncompressed analog transmission. The CCTV (closed circuit TV) video surveillance system adapts the CVBS (composite video baseband with synchronization) signal transmission over coax cable, and becomes a worldwide-deployed wired analog video transmission system. Analog transmission adopts analog modulation to carry the analog source video, which is a temporally and vertically discrete-sampled, horizontally continuous and continuous-valued 3-dimensional signal. By the raster-scan method, the source video is converted into a analog transmission signal, which is a continuous-time and continuous-valued 1-dimensional analog signals, such as CVBS, for various transmissions.

As digital technologies vastly advance, digital compressed and uncompressed video transmission have replaced or are rapidly replacing the uncompressed analog video transmission in many applications. In a typical HD IP (Internet Protocol) compressed video surveillance system, the mega-pixel IP camera employs the heavyweight digital video compression technology such as H.264 to compress the digital HD source video down to digital data at a bit rate typically about 10 Mb/s or below. The digital data of the compressed HD video are wrapped in IP packets and carried by multi-level digital modulation over Ethernet cable to the network video recorder. The HD video transmission over IP on Ethernet cable has the well-known disadvantages. First, the transmission distance is limited to 100 meters. Second, the heavyweight compression causes the loss of image quality. Third, the long latency and the varying delay of the video frames carried over IP cause the loss of promptness and smoothness. Fourth, the complexity of IP technology increases the cost in installation, operation and maintenance.

Many high-end applications, which require high video quality at zero or near-zero latency, adapt the uncompressed digital video transmission method. In a HDCCTV (high-definition closed circuit TV) video surveillance system, the HD-SDI camera transmits the digital uncompressed, high quality professional grade HD video bit-by-bit with two-level digital modulation over coax cable. However due to its high bit rate and non-optimal modulation, the HD-SDI transmission is typically limited to around 100 meter over coax cable too.

Generally, digital video transmission expresses the digital source video, which is a temporally, vertically and horizontally discrete-sampled and discrete-valued 3-dimensional signal, either compressed or uncompressed, in digital data, and adopts digital communication to carry the digital data in the discrete-time and discrete-valued digital transmission signal by various digital modulation methods. The IP cameras with fast Ethernet interface in 100base-TX mode carry the digital data over pulse signal with a set of 3 discrete voltage levels. Others with Gigabit Ethernet interface in 1000base-TX mode carry digital data over pulse signal with a set of 5 discrete voltage levels. HD-SDI cameras transmit all digital data of uncompressed digital source video over binary pulse signal with a set of 2 discrete voltage levels. The discrete values, such as the discrete voltage levels, which carry the digital data in digital modulation, are called constellations. Digital receiver needs to make decisions on which discrete values are transmitted based on received signal that is typically impaired by noise and interference. Usually as the transmission distance increases to certain length, the decision error and thus the digital bit error increase rapidly, and the receiver video quality deteriorates rapidly and becomes unusable. This is called digital cliff effect. The digital video transmission inherently suffers from the digital cliff effect. Contrarily, analog video transmission adopts the analog modulation, which generate continuous-time and continuous-valued transmission signal without constellations, and thus degrades smoothly and gradually without such cliff effect as no such decisions are made at receiver end. This is called graceful degradation.

In a search for a transmission method with long distance and cost-effectiveness, the uncompressed analog transmission of HD video has been revived. The latest invented method disclosed in patents [1] [2] adopts the HD analog composite video transmission, referred as HD-CVI. Similar to the CVBS signal (Composite Video Blanking Synchronization), the luminance picture is converted to raster-scanned luma signal, which is then transmitted in baseband; the two chrominance pictures are converted to two raster-scanned chroma signals, which are modulated into a QAM (Quadrature Amplitude Modulation) signal and transmitted in passband. Unlike CVBS, the passband chroma signal locates at higher frequency band so that it does not overlap with baseband luna signal in frequency-domain. HD-CVI can carry the HD analog composite video over coax cable for 300 to 500 meters. Due to the nature of analog video transmission, HD-CVI penetrates cable with gracefully degraded video quality.

However, uncompressed analog transmission methods are unable to take advantages of the advanced digital processing technologies and thus the performance is much limited. First, it is well recognized that the source video has strong spatial and temporal correlation and redundancy. As the HD-CVI method directly converts the 2-dimensional spatial image signal into 1-dimensional temporal signal by raster-scan methods, the correlation and redundancy are not exploited to improve the video quality of transmission. As a contrast, various digital image compression technologies, including JPEG, JPEG 200, H.264 intra frame coding etc. have been established to exploit the spatial correlation and redundancy and obtain the reconstructed image of relatively high quality at a fractional number of bits compared to the uncompressed image. Second, modern communication has developed high efficiency modulation technology such as OFDM (Orthogonal Frequency Division Multiplexing) to better combat the channel impairment. It is not adopted in analog transmission methods.

Today, as the ultra-high definition video systems and immersive vision or machine vision systems are adopted, the high-end applications move from high definition to ultra-high definition, from 30 Hz frame rate to 60 or higher, and from conventional 2D video to 180- or 360-degree immersive view of 3D or surround video. The uncompressed data rate of these new videos multiplies. Without exploit of redundancy of source video, the existing uncompressed video transmission methods are either unable to carry these new challenging videos, or the transmission distance is prohibitively limited.

Further, a mission-critical machine vision system under extreme working condition may not tolerate sudden loss of video due to digital cliff effect; instead, it may require high reliability of smooth degradation. For example, the machine vision based autonomous vehicle requires the reliable video transmission under extreme working conditions. The self-driving vehicle adopting digital video transmission is subject to sudden yet complete loss of its machine vision, i.e. go-blind, which may cause fatal failure, if the digital video transmission crashes under extreme working conditions due to its inherent digital cliff effect. Contrarily, the video transmission method with graceful degradation may continue to provide the smoothly degraded machine vision, which allows the autonomous vehicle to remain in an emergency working status, such as safely driving itself out of traffic.

Therefore, there is a need for new methods to transmit videos for high-end systems and applications, which are capable to exploit the correlation and redundancy of source video as well as high efficiency modulation to achieve high video quality and graceful degradation over long transmission distances.

SUMMARY OF THE INVENTION

The present invention presents methods to transmit video in transform-domain with quasi-continuous modulation over multi-input multi-output (MIMO) channels, comprising following steps: decorrelating the source video to generate the transform-domain residual video coefficients by video predictive coding and multi-dimensional transform (referred as decorrelating step); mapping the transform-domain residual video coefficients into one or multiple transmission streams in parallel (referred as mapping step); modulating the transmission streams into multiple transmission output signals in parallel by linear normalization and quasi-continuous modulation (referred as modulating step); and transmitting the transmission output signals onto MIMO channels in parallel (referred as transmitting step).

The present invention includes the video predictive coding as an effective method to exploit the redundancy of video. For each pixel of a video, one or multiple highly correlated reference pixels are determined. Then a pixel prediction is generated commonly from a weighted combination of the reference pixels, and the pixel prediction is subtracted from the original pixel to generate a residual pixel. Intra-frame prediction generates pixel predictions from reference pixels in same video frame only while inter-frame prediction may generates pixel predictions from reference pixels in past and future video frames. Given the order of pixel in conventional raster-scan (which converts the 3-dimensional space-time domain video signal into a 1-dimensional time-domain signal by a frame-by-frame, line-by-line and left-to-right scanning process), causal video prediction generates pixel predictions from reference pixels in earlier pixels in raster-scan order only while non-causal prediction may generates pixel predictions from reference pixels in earlier and later pixels in raster-scan order. A 3D video includes a left-eye and a right-eye video, which are strongly correlated. The inter-eye video prediction may generate pixel predictions to one-eye video from the other-eye video. The video predictive coding of the present invention includes but is not limited to any combination of inter-frame prediction, inter-frame prediction, causal prediction, non-causal prediction and inter-eye prediction method. If the pixel prediction is zeroed, the residual pixel is same as the source pixel and effectively video predictive coding is not applied. However, for purpose of brevity, this is included as an embodiment of video predictive coding in following description.

The multi-dimensional transform of the present invention includes but is not limited to 2D-DCT (2-dimensional Discrete Cosine Transform), 3D-DCT (3-dimensional Discrete Cosine Transform), 2D-DFT (2-dimensional Discrete Fourier Transform), 3D-DFT (3-dimensional Discrete Fourier Transform), 2D-DWHT (2-dimensional Discrete Walsh-Hadamard Transform), 3D-DWHT (3-dimensional Discrete Walsh-Hadamard Transform), 2D-DWT (2-dimensional Discrete Wavelet Transform) and 3D-DWT (3-dimensional Discrete Wavelet Transform).

The order of the video predictive coding and the multi-dimensional transform in the decorrelating step can be exchanged. In an embodiment of the present invention, the video predictive coding is applied before the multi-dimensional transform. The video predictive coding is applied to the source video in space-time domain to generate the residual video also in space-time domain. Then the residual video in space-time domain is transformed into residual video coefficients in a transform-domain by the multi-dimensional transform. In another embodiment of the present invention, the multi-dimensional transform is applied before the video predictive coding. Accordingly, the multi-dimensional transform is applied to the source video, and transforms the source video into video coefficients in a transform-domain. Then a video predictive coding method in transform-domain is applied to convert the video coefficients into the residual video coefficients.

The quasi-continuous modulation of the present invention, which uses a quasi-continuous digital signal as the to-be-modulated signal, includes but is not limited to quasi-continuous OFDMA (Orthogonal Frequency Division Multiple Access) and quasi-continuous CDMA (Code Division Multiple Access).

In an embodiment of the present invention, 2D-DCT is adopted as the multi-dimensional transform, and OFDMA modulation is adopted. At the video transmitter, the image in each video frame is transformed by the 2D-DCT. The obtained DCT coefficients are mapped onto the frequency bins of OFDM symbols. The OFDM symbols are transformed into time-domain, typically by (IFFT Inverse FFT) and cyclically extended with CP (cyclic prefix) or CS (cyclic suffix) or both. The obtained time-domain OFDM symbols are transmitted onto MIMO channels by a multi-output transmitter. This method is referred as the DCT-OFDMA transmission method.

Theoretically, the value s of the DCT coefficients in the DCT-OFDMA transmission method can vary continuously depending on the image signal. When the DCT-OFDMA transmission method is adopted to carry the spatially and temporally discrete-sampled but continuous-valued 3-dimensional source video, referred as sampled video, the DCT-OFDMA method produces continuous-valued DCT coefficients. Thus, after these continuous-valued DCT coefficients are mapped to frequency bins of OFDM symbols, opposite to the normal digital OFDM modulation, the values of such OFDM frequency bins can vary continuously too, without constellations in any way. Such OFDM frequency bins are referred as the continuous OFDM frequency bins. Such OFDM modulation method in the DCT-OFDMA transmission method is referred as the continuous OFDM modulation. In time-domain, the continuous OFDM modulation produces discrete-time but continuous-valued transmission output signals. When the sampled video meets the requirement of Nyquist sampling theorem, the original analog video before sampling can be reconstructed from the sampled video without any distortion. Thus, without any compression loss, the uncompressed DCT-OFDMA method in continuous-valued modulation is equivalent to a new analog video transmission method, and can be regarded as the discrete-time implementation of the respective new analog transmission method.

Practically, the DCT-OFDMA method is typically adopted to carry digital source video. When the sampled video is converted to the digital video, the continuous pixel value is typically quantized with high precision, and the digital pixel value is the digital approximate of the continuous value and varies nearly continuously in certain sense of engineering though mathematically discretely. For example, the high precision digital video can be visually indistinguishable with the original analog source video if the quantization noise floor is below the human visual threshold. For another example, the digital video reaches close or nearly identical performance as the original analog video after transmission when the quantization noise floor is close to or below the receiver noise floor. The nearly continuous-valued digital signal that is the digital approximate of a continuous-valued signal is referred as quasi-continuous-valued digital signal, or quasi-continuous digital signal. In addition, a quasi-continuous value can be produced by the computation involving one or multiple quasi-continuous values. Accordingly, when the digital pixel is quasi-continuous-valued, the DCT-OFDMA method produces quasi-continuous-valued DCT coefficients, and further quasi-continuous-valued frequency bins in OFDDM symbol. Such OFDM modulation is referred as quasi-continuous OFDM modulation. In time-domain, quasi-continuous OFDM modulation produces discrete-time but quasi-continuous-valued transmission signal. If without any compression adopted, the uncompressed DCT-OFDMA method in quasi-continuous-valued modulation is equivalent to the new analog video transmission with quantization noise, and can be regarded as the digital approximate implementation of the respective new analog transmission with limited number of bits precision. However for the purpose of brevity, the following description does not strictly differentiate continuous-valued or quasi-continuous-valued modulation, and may disclose the method of present invention in quasi-continuous-valued modulation only.

The quasi-continuous OFDM modulation is different from the conventional digital OFDM modulation, whose frequency bins, referred as the digital OFDM frequency bins, are used to carry the digital data bits with constellations. In contrast to a quasi-continuous OFDM frequency bin, a digital OFDM bin is exactly discrete-valued without any approximation as the exact discrete value is selected from the digital constellations. In practical system, the quasi-continuous modulation often prefers high precision and huge set of discrete values to better approximate the continuous modulation while the digital modulation is often limited to small set of discrete values to keep decision error rate low or nearly zeros. For example, when the digital DCT coefficient is approximated by 12 bit and a pair of DCT coefficients are mapped into a complex OFDM frequency bin, the quasi-continuous complex OFDM frequency bin may have a set of 16 million discrete values. Contrarily, a digital OFDM frequency bin with digital QPSK (Quadrature Phase-Shift Keying) modulation has a set of 4 discrete values only.

Similarly, in another embodiment of the present invention, at the video transmitter the image of each video frame is transformed by the spatial 2D-DCT (two-dimensional Discrete Cosine Transform). The obtained DCT coefficients are assigned to the different spreading codes or spreading sequences according to CDMA modulation, and modulate the assigned spreading sequences by arithmetic multiplication of DCT coefficients with their spreading sequences respectively. All modulated sequences are summed together and the combined CDMA signal is transmitted in time-domain onto the MIMO channels. This method is referred as the DCT-CDMA transmission method. Similarly, in theory, the values of the DCT coefficients in the DCT-CDMA transmission method can vary continuously depending on the video signal. When the DCT-CDMA method is adopted to carry the sampled video, the method produces continuous-valued DCT coefficients. After assignment, opposite to the normal digital CDMA modulation, the baseband signal (to-be-spread signal) value to be multiplied with the spreading sequences, and the amplitude of the modulated sequences after multiplications in DCT-OFDMA transmission method, can vary continuously too, without constellations in any way. These spreading sequences are referred as the continuous CDMA spreading sequences. Such CDMA modulation method in the DCT-CDMA transmission method is referred as the continuous CDMA modulation. Practically, when the DCT-CDMA transmission method is adopted to carry digital source video, it generates quasi-continuous-valued DCT coefficients, and the discrete-time but quasi-continuous-valued transmission output signal. Such CDMA modulation with quasi-continuous-valued baseband signal or to-be-spread signal is referred as the quasi-continuous CDMA modulation.

For the purpose of brevity, the quasi-continuous OFDMA modulation is used as an example to disclose the present invention in the follow description. The variations employing quasi-continuous CDMA or other modulation methods can be derived within the scope the present invention.

The MIMO channels of present invention include but are not limited to multi-antenna wireless channels and multi-pair cable channels. A multi-antenna wireless channel has $n_{tx}$ transmitter antennas and $n_{rx}$ receiver antennas, denoted by $n_{tx} \times n_{rx}$ MIMO channel, where $n_{tx}$ and $n_{rx}$ are positive integers. When $n_{tx}$ and $n_{rx}$ are 1, it is indeed the conventional single-input single-output channel, called SISO channel. When $n_{tx}$ is 1 and $n_{rx}$ is larger than 1, it is indeed the single-input multi-output channel, called SIMO channel. However, it is to be noted that SISO and SIMO are all included in MIMO channels in present invention in following description. A multi-pair cable channel includes but is not limited to a Cat5e Ethernet cable, Cat6 Ethernet cable and aggregated coax cable. The Cat5e/6 Ethernet cable has 4 separate pairs of UTP wires in the cable. When all 4 pairs are actively driven and received, the cable becomes a 4×4 MIMO channel.

At the transmitter side, the mapping step of the present invention maps the residual transform coefficients into $m_{tx}$ different transmission streams, where $m_{tx}$ is a positive integer number and is equal to or less than $n_{tx}$. When $m_{tx}$ is smaller than $n_{tx}$, e.g. 2 transmission streams and 4 transmission output signals, the modulating step includes the space-domain coding or space-time domain coding to encode the 2 transmission streams into 4 transmission output signals, which are sent to 4 wireless antennas or line drivers or.

The normalization of the present invention scales each segment of each transmission output signal by a constant number chosen under certain criteria. In the embodiment of DCT-OFDMA method, a segment of a transmission output signal includes one or multiple OFDM symbols. In the embodiment of DCT-CDMA method, a segment of a transmission output signal includes one or multiple CDMA spread words. The scaling is linear and the number is called scaling factor. The scaling factor may and often vary among different segments of each transmission output signal. The scaling factor may or may not vary among segments of different transmission output signals in same time-slot. In an embodiment of the present invention, each segment of different transmission output signals is normalized separately. For example, when 4 transmission output signals are generated by the modulating step to drive a 4×4 MIMO channel, 4 OFDM symbols are generated in parallel during each OFDM symbol time-slot, each symbol is normalized separately by its own scaling factor. In another embodiment of the present invention, the segments of all transmission output signals in same time-slot are normalized together. For example, when 4 transmission output signals are generated by the modulating step to drive a 4×4 MIMO channel, 4 OFDM symbols are generated in parallel during each segment time-slot, but these 4 OFDM symbols are normalized together by same scaling factor. Further, as the normalization is linear scaling, in an embodiment of present invention, it is applied to the to-be-modulated transmission segments before modulation, e.g. in frequency-domain before IFFT in quasi-continuous OFDM modulation. In another embodiment of the present invention, it is applied to modulated transmission segments after modulation, e.g. in time-domain after IFFT in quasi-continuous OFDM modulation. The scaling factors are included in metadata in addition to the video coefficients, and are transmitted by either quasi-continuous modulation or conventional digital modulation.

The mapping step of the present invention adopts various value mapping methods to convert the transform-domain residual transform coefficients into transmission streams, including but not limited to one-to-one mapping and multiple-to-one mapping. In an embodiment of the present invention adopting DCT-OFDMA, the one-to-one mapping takes a pair of quasi-continuous DCT coefficients a and b, and generates a complex value a+jb, and assigns it to an OFDM frequency bin, where j is the square root of −1. One DCT coefficient is mapped into a real or imaginary part of a complex OFDM bin. In another embodiment of the present invention adopting DCT-OFDMA, the multiple-to-one mapping takes multiple pairs of quasi-continuous DCT coefficients, such as 2 pairs, a and b, c and d, and generates a complex OFDM frequency bin (a+bM)+j(c+dM), where j is the square root of −1, and M is a certain constant chosen under specific criteria. At the receiver of the present invention, a and b can be separated by modulo M operation from the real part, and so can c and d from the imagery part.

The mapping step of the present invention adopts various mapping order to map the transform-domain residual DCT coefficients in transform blocks into the to-be-modulated signal segments of the transmission streams. In an embodiment of the present invention adopting DCT-OFDMA, the residual DCT coefficients in each transform block are zigzag scanned and ordered into a 1-dimensional block coefficient array. Each transform block is scanned into its own block coefficient array. In one embodiment, suppose every $2*m_{tx}$ transform blocks are mapped into $m_{tx}$ transmission streams, i.e. a pair of transform blocks are mapped into 1 transmission streams, where $m_{tx}$ is number of transmission streams and is a positive integer. Under one-to-one value mapping, starting at lowest index, a pair of DCT coefficients are taken from a pair of block coefficient arrays (each scanned from a transform block) at same index, and a complex value is formed and assigned to a transmission stream at the unassigned OFDM subcarrier with lowest temporal frequency. This is referred as the lowest-to-lowest mapping. This embodiment requires integer of number of transform blocks to be mapped into an OFDM symbol. In another embodiment, all block coefficient arrays are interleaved together to form a region coefficient array, which is to be mapped into $m_{tx}$ segments of transmission streams, i.e. $m_{tx}$ OFDM symbols in parallel. Under one-to-one value mapping, a pair of coefficients are taken from the region coefficient array at lowest index, a complex number is formed and assigned to the unassigned OFDM subcarrier of a transmission stream with lowest temporal frequency. Then the lowest index moves to next pair of coefficients in the region coefficient array until all coefficients are mapped. This is also referred as the lowest-to-lowest mapping. However, this embodiment does not require integer number of transform blocks to be mapped into an OFDM symbol.

Generally, a video signal has strong correlation. After video predictive coding, the residual video signal is still correlated though less strongly. Accordingly, the residual DCT coefficients in a transform block are not white. The DC coefficient is usually stronger than AC ones, and lower frequency AC coefficients are usually stronger than higher ones. A zigzag scan usually scans the DC coefficient first, then followed by low spatial frequency ones and high spatial frequency ones. Thus, a 1-dimensional DCT coefficient array approximately has a decreasing magnitude statistically. In video transmitted over a single cable channel, e.g. a coax cable, or a MIMO cable channel with weak crosstalk, e.g. a 4×4 Cat5e/6 cable, the attenuation at lower frequencies is less than higher ones. The lowest-to-lowest mapping tends to carry the strongest residual DCT coefficient over the best subcarriers over cable channels. This typically yields high performance. In another embodiment of the present invention adopting DCT-OFDMA, the residual DCT coefficients in each transform block are still zigzag scanned and ordered in a 1-dimensional DCT coefficient array, and multiple block coefficient arrays are interleaved together to form a region coefficient array. However, the MIMO channel matrix at each subcarrier in frequency-domain is obtained either explicitly or implicitly at the transmitter side from the receiver side, and singular values are obtained by SVD (singular value decomposition) of the channel matrix at each subcarrier in frequency-domain. Each singular value represents an independent sub-channel, referred as a singular sub-channel. All singular sub-channels are ordered in such a way that their respective singular values form a 1-dimensional array with descending order, i.e. biggest singular value at lowest index. Under one-to-one mapping, starting at lowest index, a pair of DCT coefficients are taken from the region coefficient array at the lowest index, and a complex value is formed and assigned to the unassigned singular sub-channel with lowest index. Then the lowest index in the region coefficient array moves to next pair of coefficients until all coefficients are mapped. This is referred as the lowest-to-largest mapping.

In video transmission over a wireless MIMO channel, the channel attenuation over frequency can fluctuate arbitrarily (though under certain physical restriction), may not increase monotonously as does in cable channels. The lowest-to-largest mapping tends to carry the strongest residual DCT coefficient over the best singular sub-channel. This typically yields high performance.

There are various variations to the lowest-to-lowest and lowest-to-largest mapping. In an embodiment of DCT-OFDMA, multiple zigzag scanning orders are defined. Based on the magnitude pattern of transform blocks and under certain criteria, a specific zigzag scanning order is chosen to scan DCT coefficient block into a 1-dimensional array. Different zigzag scanning orders can be chosen for different DCT coefficient blocks. The information of chosen scanning order is included in transmission as metadata and is carried typically by digital modulation.

The methods of the present invention may further include compressing the spectrum by zeroing the residual DCT coefficients whose magnitudes are below certain threshold. These zeroed DCT coefficients are skipped in mapping step, and are excluded from transmission. Thus, less DCT coefficients are transmitted and the transmission output signals have narrower spectrum. When the index of zeroed DCT coefficients are not fixed, the index information of zeroed coefficients is included in metadata too, and is transmitted typically by conventional digital modulation.

The methods of the present invention may further include spreading the spectrum. This may improve the video performance. In an embodiment of DCT-OFDMA, the frequency bins generated by mapping step undergo a CDMA modulation in frequency-domain. The number of sub-carriers a frequency-domain spreading sequence occupies is larger than the number of frequency bins generated by mapping. Therefore, the spectrum after spreading becomes wider. Then CDMA modulated word is passed to modulating step and transmitted.

The prior invention US2007098063A1, titled Apparatus and Method for Uncompressed, Wireless Transmission of Video [3], discloses methods to transmit video in DCT transform-domain with OFDM modulation. However, the DCT-OFDMA methods of the present invention are substantially different from the prior invention US2007098063A1 in:

a) Using both digital and quasi-continuous modulation simultaneously to carry the same DCT coefficient or not. US2007098063A1 uses both digital and quasi-continuous modulation simultaneously to carry the same video DCT coefficient. The DCT coefficients are divided into two sets. The $1^{st}$ set includes the DC and low spatial frequency coefficients, which typically determine major video quality. The $2^{nd}$ set includes the rest high spatial frequency coefficients, which determines video details. The $1^{st}$ set is digitally quantized, broken down into digital bits and carried by digital OFDM bins. The $2^{nd}$ set is equivalently quantized to 0, and not transmitted in digital modulation. This part is the lossy digital video transmission. Simultaneously, the quantization error values of the $1^{st}$ set are assigned to quasi-continuous OFDM bins to "patch" the digital transmission so the combined transmission becomes lossless. It is to be noted that all DCT coefficients in the $1^{st}$ set are transmitted in both digital modulation and quasi-continuous modulation simultaneously. As US2007098063A1 transmits the digitally quantized DCT coefficients of a video signal in digital modulation, it is subject to digital cliff effect in same way as other digital transmissions, and does not provide the needed graceful degradation. contrarily, the methods of the present invention do not use both digital and quasi-continuous modulation simultaneously to carry same DCT coefficient. In an embodiment of uncompressed lossless video transmission, the whole values of all DCT coefficients are carried by quasi-continuous OFDM bins, neither with any digital quantization nor with digital OFDM bins. This eliminates the digital cliff effect, thus provides the needed graceful degradation and high reliability, comparable to analog transmission;

b) Including predictive coding or not. US2007098063A1 does not employ video predictive coding to exploit the video redundancy and instead transmit the original source video. It is one of existing uncompressed video transmission methods without video predictive coding. The methods of the present invention include video predictive coding to largely eliminate or reduce the redundancy in video signal, and thus increase video performance. The present invention provides new uncompressed video transmission methods with predictive coding; and c) companding or normalizing. US2007098063A1 performs companding (in same principle as a-law and u-law algorithm) to non-linearly map the value of each DCT coefficient into another value. The normalizing of the modulating step of the present invention uses same scaling factor to linearly scale all video subcarrier of a whole OFDM symbol so that certain parameter (e.g. mean power, peak power etc) of the scaled OFDM symbol tends to be equal or close, i.e. normalized. An OFDM symbol after companding is not normalized. The two operations are principally different.

DETAILED DESCRIPTION OF THE INVENTION

Figure 1:
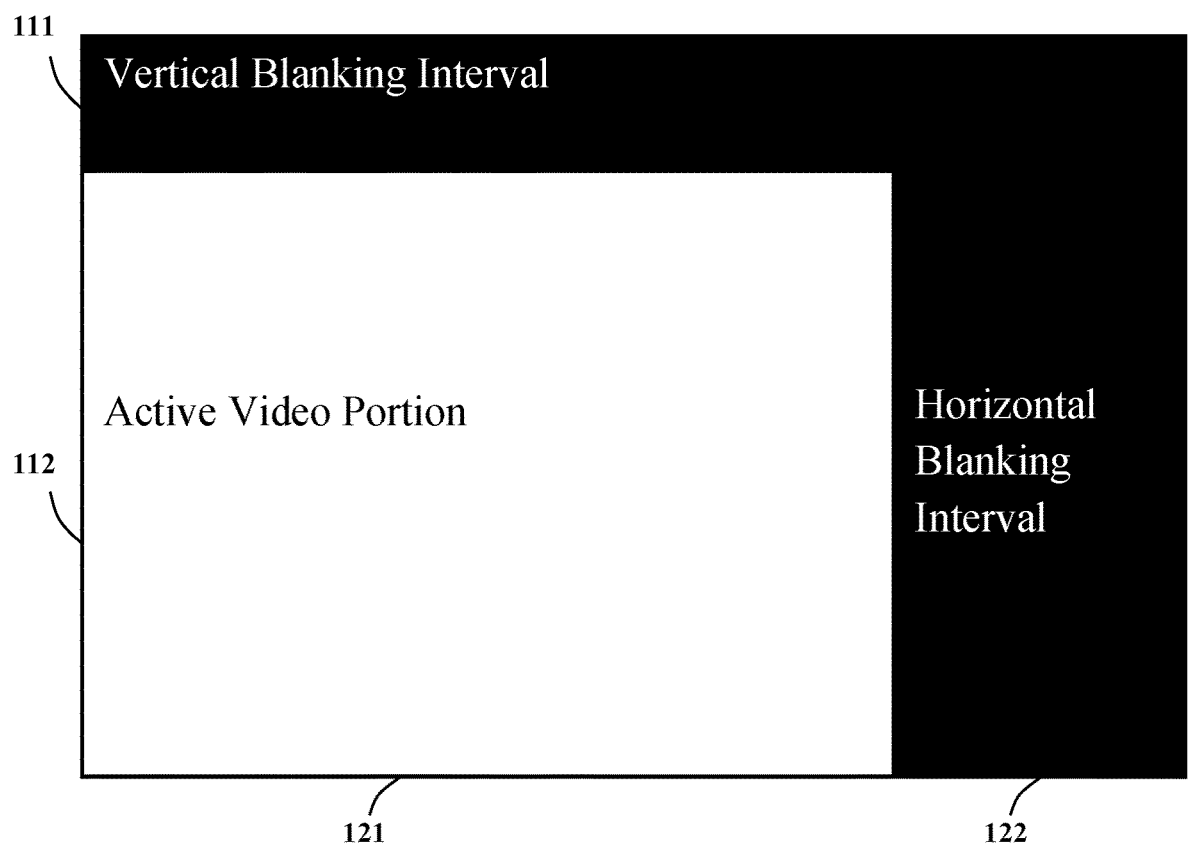
FIG. 1 illustrates the video frame timing of an example HD 720p60 video in YUV4:2:0 format.

The principle and embodiments of the present invention will now be described in detail with reference to the drawings, which are provided as illustrative examples so as to enable those skilled in the art to practice the invention. Notably, the figures and examples below are not meant to limit the scope of the present invention to a single embodiment but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice versa, unless explicitly stated otherwise herein. Moreover applicants do not intend for any term in the specification or claims to be ascribed an uncommon or special meaning unless explicitly set forth as such. Further, the present invention encompasses present and future known equivalents to the components referred to herein by way of illustration. In the following description, the HD video 720p60 in color format YUV4:2:0, as shown in FIG. 1, is assumed for the original source video as an example to illustrate the principle and an embodiment of the present invention. The HD 720p60 has 60 progressive scanned video frames per second. The period of each video frame is 1/60 second, as represented by the outmost rectangle in FIG. 1. Each video frame has 750 scan lines. The first 30 scan lines are vertical blanking lines, whose duration is referred as the vertical blanking interval 111. The rest 720 scan lines are active video lines, whose duration is referred as the vertical active interval 112. Each scan line has 1650 samples when it is sampled at 74.25 MHz frequency. The last 370 samples of each scan line is the horizontal blanking, whose duration is referred as the horizontal blaming interval 122, and the front 1280 samples of each active video line, whose duration is referred as the horizontal active interval labeled as 121, carry the active 1280 luma pixels. All active luma pixels in all active video lines, i. e. the pixels in the active video portion, represent an HD luma image Y of 1280×720 pixels of a video frame. Due to the horizontal and vertical chroma sub-sampling of factor of 2, the two chroma images, U and V, are 640×360 pixels only.

In certain embodiment of the present invention with a 2-dimensional transform, at the video transmitter each image of source video is divided into small 2-dimensional pixel blocks, such as 8×8 pixel blocks where 8×8 pixel denotes 8 pixel wide by 8 pixel high 2-dimensional blocks. The video predictive coding generates a prediction pixel block for each source pixel block. The prediction pixel block is subtracted away from the source pixel block to produce a residual pixel block, and each residual pixel block is converted into a DCT coefficient block of same size by 2D-DCT.

In certain embodiment of the present invention with a 3-dimensional transform, at the video transmitter the frame sequence of the source video is divided into video segments, each of which comprises multiple video frames. Then each video segment is divided into small 3-dimensional pixel blocks, such as 8×8×8 pixel blocks for 8-frame long video segments, where 8×8×8 denotes a pixel region of 8 pixels wide by 8 pixels high and 8 video frames long. The video predictive coding generates a prediction pixel block for each source pixel block. The prediction pixel block is subtracted away from the source pixel block to produce a residual pixel block, and each residual pixel block is converted into a DCT coefficient block of same size by 3D-DCT.

Figure 2:
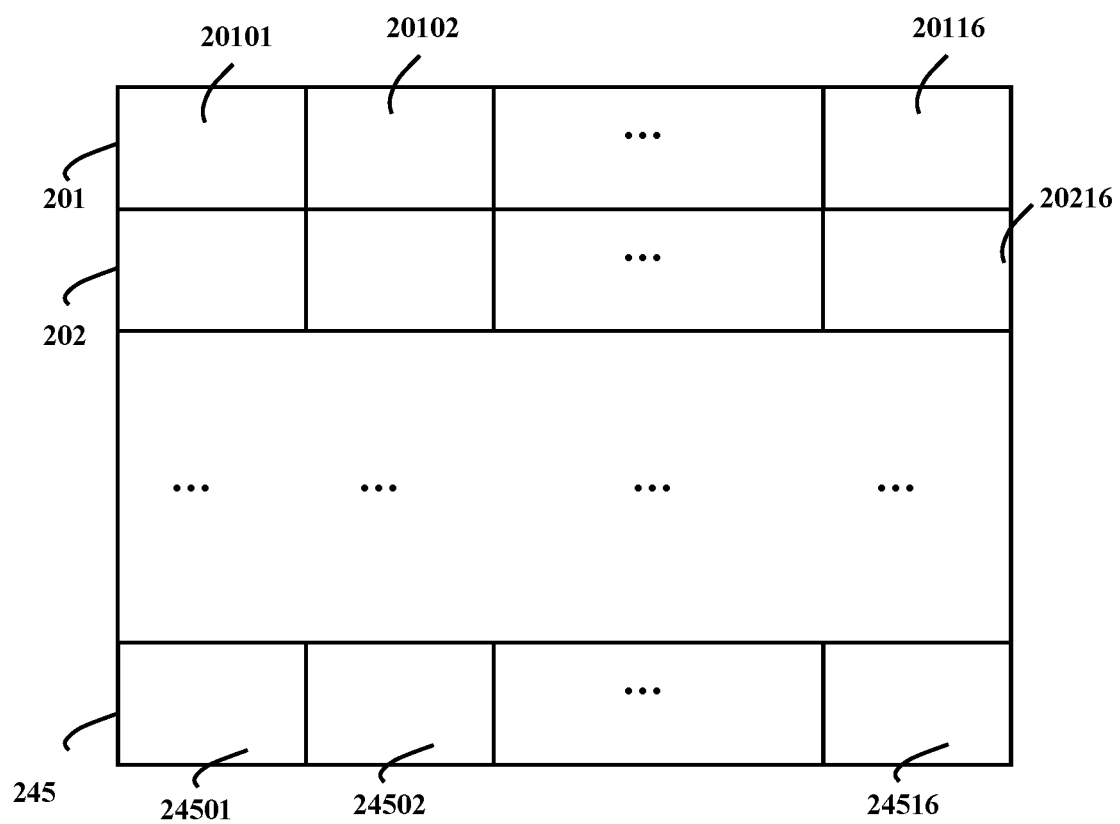
FIG. 2 illustrates an embodiment of how an example HD image is partitioned into slices and regions in the present invention.
Figure 3:
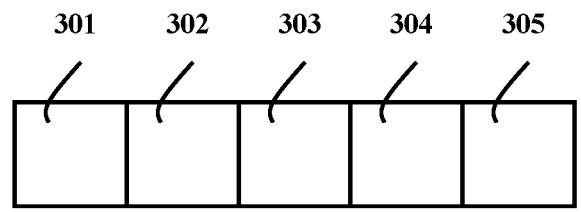
FIG. 3 illustrates an embodiment of how a region is partitioned into macro-blocks in the present invention.
Figure 4:
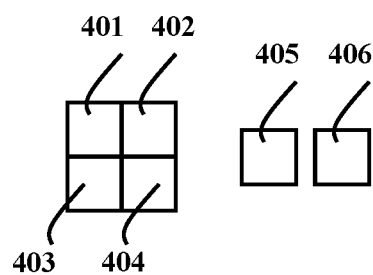
FIG. 4 illustrates an embodiment of how a macro-block is partitioned into transform blocks.

In the illustrated embodiment of the present invention, the HD 1280×720 image of each video frame is partitioned into pixel blocks, normalization regions and transmission regions, as shown in FIGS. 2 to 4, in preparation for the following processing steps of the transmission methods of the present invention. First, the HD 1280×720 image is partitioned into 45 horizontal slices, labeled as 201, 202 . . . , 245 from top to bottom respectively as shown in FIG. 2. Each horizontal slice is 1280×16 pixels. Second, each slice is divided into 16 regions, labeled as 20101 20102 . . . , 20116 from left to right in the first slice 201, and so on to 24501, 24502 . . . , 24516 in the last slice 245. Each region is 80×16 pixels. These regions are adopted as both the normalization regions and the transmission regions in the illustrated embodiment of the presented transmission methods. Third, each region is divided into 5 macro-blocks, labeled as 301, 302, . . . , 305 from left to right, as shown in FIG. 3. Each macro-block is 16×16 pixels. Last, each macro-block includes a luma image of 16×16 pixels and two chroma image of 8×8 pixels. The 16×16 pixel luma image is divided into 4 luma blocks. Each luma block is 8×8 pixels, labeled as 401, 402, 403 and 404 respectively in FIG. 4. The two 8×8 pixel chroma blocks are labeled as 405 and 406 respectively. The 8×8 pixel block is adopted as the pixel block in the illustrated embodiment of the present invention.

Figure 5:
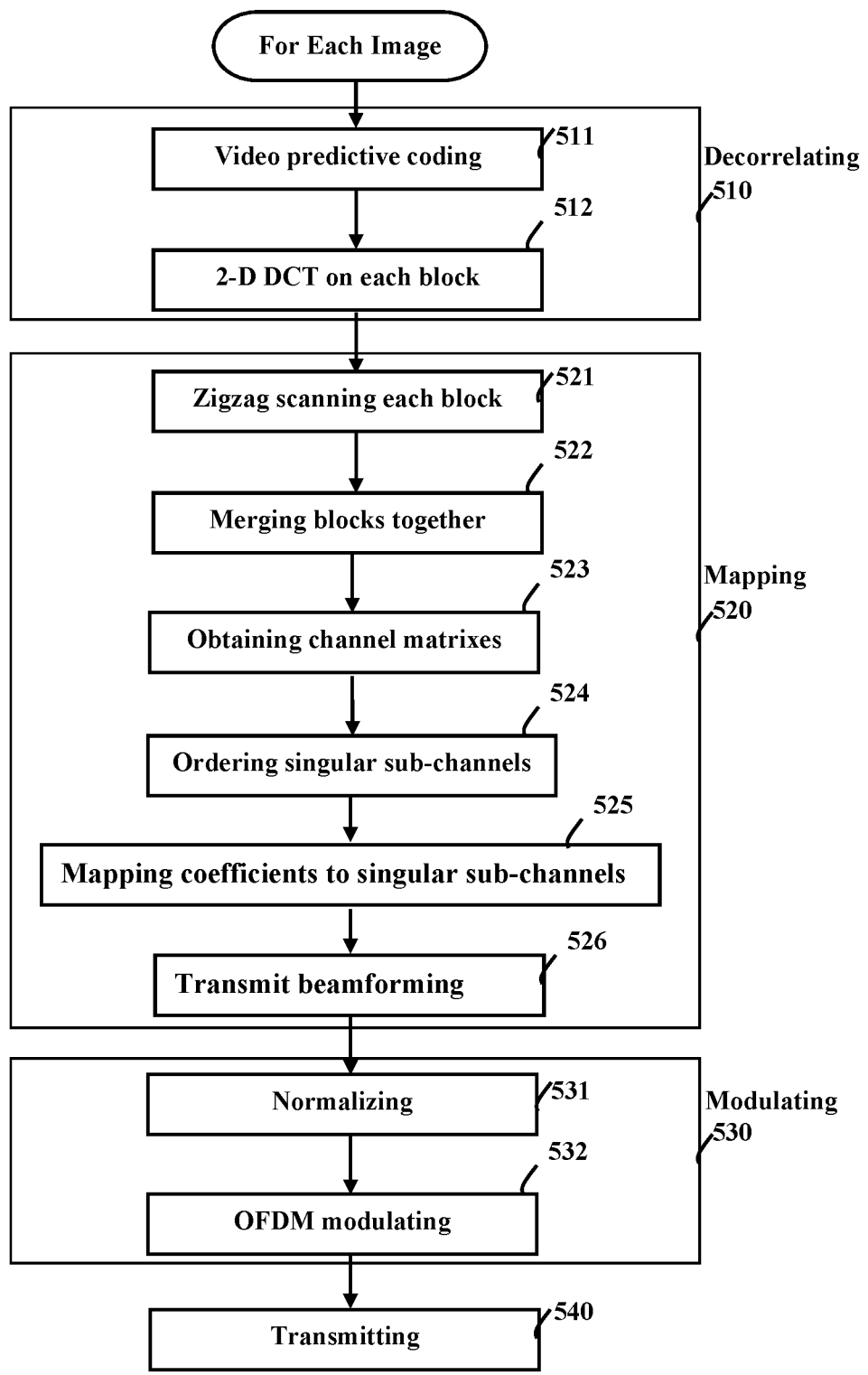
FIG. 5 illustrates an embodiment of the presented methods of video transmission.

FIG. 5 shows an embodiment of the presented methods of video transmission. It is supposed that the source video is carried in 4 independent transmission streams over a 4×4 wireless MIMO channel. The DCT-OFDMA method is adopted in the illustrated embodiment. Other methods including DCT-CDMA can be derived accordingly. Further, 2D-DCT is adopted, and thus the illustrated transmission methods are performed on the image of each video frame of the source video after it is partitioned as mentioned above. Other methods including 3D DCT can be derived, e.g. the source is divided into video segments of 8 frames long, and the methods in the illustrated embodiment in FIG. 5 are applied to each video segment instead of each video frame. The methods in the embodiment illustrated in FIG. 5 include following steps:

Step 1 Decorrelating, shown as 510. The step decorrelates the source video to generate the transform-domain residual video coefficients by video predictive coding and multi-dimensional transform, including following detailed steps:

Step 1a. Video predictive coding, shown as 511. In the illustrated embodiment of the present invention, for each 8×8 source pixel block, the video predictive coding 511 generates an 8×8 pixel prediction block from the pixels in same image, in past/future images, or in other-eye images. The prediction pixel block is subtracted from the source pixel block to produce a residual pixel block. There are various methods to generate the prediction block. These methods are beyond the scope of the present invention and are not detailed.

Step 1b. 2D-DCT, shown as 512. In the illustrated embodiment of the present invention, this step converts each 8×8 residual pixel block into the DCT transform-domain, and produces a residual DCT coefficient block of same size. The order of blocks into DCT transform can vary. In a certain embodiment of the present invention, in order to minimize processing latency, all blocks in first region 20101 are transformed first, then the next region 20102 is transformed, and so on the last region 24516.

In an embodiment of the present invention, the step 1a and 1b of the decorrelating 510 are exchanged, i.e. the video predictive coding 511 is applied after 2D-DCT 512 and thus is applied in transform-domain.

Step 2 Mapping, shown as 520. In the illustrated embodiment of the present invention, this step maps the transform-domain residual video coefficients into 4 transmission streams in parallel, including following detailed steps:

Step 2a. Zigzag scanning each DCT coefficient block into a 1-dimensional block coefficient array, shown as 521. In the illustrated embodiment of the present invention, each 8×8 DCT coefficient block in the region is zigzag-scanned into a one-dimensional block coefficient array of 64 elements.

Step 2b. Merging all block coefficient arrays in a region into a one-dimensional region coefficient array, shown as 522. In the illustrated embodiment of the present invention, there are 30 block coefficient arrays in the region. All block coefficient arrays are interleaved to produce the region coefficient array of 1920 elements long. The first element of first block coefficient array goes to first element of the region coefficient array. The second element of first block coefficient array goes to 31$^{st}$ element of the region coefficient array and so on. The interleaving order is given by following formula index of region coefficient array=(index of block coefficient array−1)*30+index of coefficient block where the index of region coefficient array is an integer in range from 1 to 1920, the index of block coefficient array is an integer in range from 1 to 64, and the index of coefficient block is an integer in range from 1 to 30.

Step 2c. Obtaining the frequency-domain channel matrix at each subcarrier, shown as 523. Over the 4×4 wireless MIMO channel in the illustrated embodiment, suppose OFDM symbol with 256 subcarrier is adopted and 240 out of the 256 subcarriers are used to carry DCT coefficients with quasi-continuous modulation, referred as video subcarrier. The 240 frequency-domain channel matrixes at all video subcarriers are obtained at transmitter side. In one embodiment, 240 frequency-domain channel matrixes are estimated at receiver side and are transmitted back to the transmitter side explicitly. In another embodiment, the transmitter side implicitly estimates the channel matrixes (from transmitter to receiver) by the aid of reverse training (from receiver to transmitter). Those methods are known and are not detailed.

2d. Ordering all singular sub-channels by their singular values, shown as 524. In the illustrated embodiment, all 240 frequency-domain channel matrixes are 4×4 matrixes. Each 4×4 channel matrix is decomposed by Singular Value Decomposition (SVD) to obtain its 4 singular values. Let $H_k$ denote the frequency-domain channel matrix at subcarrier k, then SVD gives 4×4 orthogonal matrix $U_k$, $V_k$, and diagonal matrix $\text{Diag}\{s_{k1}, s_{k2}, s_{k3}, s_{k4}\}$, which satisfy $$H_k = U_k \text{Diag}\{s_{k1}, s_{k2}, s_{k3}, s_{k4}\} V_k^H$$

where $s_{k1}, \ldots s_{k4}$ are non-negative real numbers, referred as singular values of subcarrier k, and $V_k^H$ denotes the Hermitian transpose of matrix $V_k$. The position of each singular value represents a singular sub-channel. In the illustrated embodiment, there are 960 singular values and sub-channels. All singular sub-channels are ordered in such a way that their respective singular values are in descending order, i.e. the singular value of a singular sub-channel at lower index is larger than or equal to the value of one at higher index. Such ordered singular sub-channels are referred as singular sub-channel array.

2e. Mapping coefficients to singular sub-channels, shown as 525. In the illustrated embodiment, starting from lowest index, a pair of DCT coefficients are taken from the region coefficient array, and a complex number is form by one-to-one value mapping. The complex number is assigned to the unassigned singular sub-channel at lowest index. Then the mapping moves to next pair of DCT coefficients until all coefficients are mapped.

2f. Transmit beamforming, shown as 526. After all singular sub-channels are assigned, let $x_{km}$ denotes the complex number assigned to m-th singular sub-channel at subcarrier k, where k=1, . . . , 240 and m=1, 2, 3, 4. The 4 frequency bins at subcarrier k are assigned with 4 complex values in a 4-row column vector $Y_k$, which is given by $$Y_k = \begin{bmatrix} y_{k1} \\ \vdots \\ y_{k4} \end{bmatrix} = V_k \begin{bmatrix} x_{k1} \\ \vdots \\ x_{k4} \end{bmatrix}$$

where $V_k$ is obtained in SVD of channel matrix $H_k$ [4].

After transmit beamforming, the 240 video sub-carriers of all 4 OFDM symbols for 4 transmission streams are assigned with mapped values.

Step 3 Modulating, shown as 530. In the illustrated embodiment, this step modulates 4 transmission streams into 4 transmission output signals in parallel by linear normalization and quasi-continuous OFDM modulation, including following detailed steps:

Step 3a. Normalizing, shown as 531. In the illustrated embodiment of the present invention, the normalization step multiplies the frequency bins at all video subcarrier of 4 OFDM symbols with a scaling factor to make certain characteristic value equal to close. In one embodiment of the present invention, the average power of all video frequency bins in the 4 OFDM symbols is calculated, and is compared to a specific value to determine the scaling factor. After all video frequency bins are scaled, the average power of video frequency bins is equal or close to the specific value. In another embodiment of the present invention, the peak value of video frequency bins is found and the scaling factor is chosen to normalize the peak value of the 4 OFDM symbols. The scaling factor is transmitted as metadata and carried in quasi-continuous modulation or digital modulation.

Step 3b. OFDM Modulating, shown as 532. In the illustrated embodiment, the 256-point IFFT converts all 4 OFDM symbol of the 4 transmission streams from frequency-domain to time-domain. Then the 4 OFDM symbols are cyclically extended with CP or CS or both.

In another embodiment of the present invention, the step normalizing 531 and the step OFDM modulating 532 of the step modulating 530 are exchanged, i.e. the step normalizing 531 is applied after the step OFDM modulating 532 and thus is applied in time-domain.

Step 4. Transmitting, shown as 540. In the illustrated embodiment, 4 cyclically extended OFDM symbols are unconverted to same RF channel to generate the 4 RF transmission output signals in-parallel. Then the 4 RF transmission output signals are sent out wirelessly in parallel via 4 transmit antennas.

It is worth to note that the illustrated embodiment of the presented transmission methods in present invention do not incur variable processing delay, but fixed processing delay as all DCT coefficients are carried by quasi-continuous modulation. Assuming the input is raster-scanned video signal, the theoretic minimum delay in the illustrated embodiment of the present invention is 16 scan line period for the video transmitter. Assuming output is raster-scanned video signal, the theoretic minimum delay is 16 scan line period for the video receiver. The total theoretic minimum end-to-end delay is 32 scan line period.

It is further to be noted that though the present invention is described according to the accompanying drawings, it is to be understood that the present invention is not limited to such embodiments. Modifications and variations could be effected by those skilled in the art without departing from the spirit or scope of the invention as defined in the appended claims. The illustrated embodiments of the present invention only serve as examples of how to apply the present invention to transmit the video. There are various embodiments of the present invention. These embodiments are not detailed, as these can be derived by those who are skilled in this.

REFERENCE

[1] Jun Yin et al., Method and device for transmitting high-definition video signal, Pub. No. CN102724518A, CN1027245188, WO2013170763A1, May 6, 2012
[2] Jun Yin et al., Method and device for high-definition digital video signal transmission, and camera and acquisition equipment, Pub. No. CN1027245 19A, CN 102724519 B, WO2013170766A1. May 6, 2012
[3] Zvi Reznic et al., Apparatus and method for uncompressed, wireless transmission of video, Pub. No. US2007/0098063 A1, May 3, 2007
[4] Thomas Paul and Tokunbo Ogunfunmi, Understanding the IEEE 802.11n Amendment, IEEE Circuits and Systems magazine, $1^{st}$ quarter 2008

I claim:

1. A method to transmit video over a multi-input multi-output (MIMO) channel, comprising:
    decorrelating a source video to generate transform-domain residual video coefficients by video predictive coding and multi-dimensional transform;
    mapping the transform-domain residual video coefficients into one or a plurality of transmission streams in parallel by sub-carrier or sub-channel optimized sorting;
    modulating the plurality of transmission streams in parallel into a plurality of transmission output signals by linear normalization and quasi-continuous modulation; and
    transmitting the plurality of transmission output signals in parallel onto an MIMO channel via a plurality of antennas or cable drivers.

2. The method to transmit video over a multi-input multi-output (MIMO) channel of claim 1, wherein the video predictive coding comprises intra-frame predictive coding, inter-frame predictive coding, causal predictive coding, non-causal predictive coding, inter-eye predictive coding, and no-prediction video coding with pixel predictions zeroed.

3. The method to transmit video over a multi-input multi-output (MIMO) channel of claim 1, wherein the multi-dimensional transformation comprises 2D-CT (2-dimensional Cosine Transform), 3D-CT (3-dimensional Cosine Transform), 2D-DFT (2-dimensional Discrete Fourier Transform), 3D-DFT (3-dimensional Discrete Fourier Transform), 2D-DWHT (2-dimensional Discrete Walsh-Hadamard Transform), 3D-WHT (3-dimensional Walsh-Hadamard Transform), 2D-DWT (2-dimensional Discrete Wavelet Transform) and 3D-DWT (3-dimensional Discrete Wavelet Transform).

4. The method to transmit video over a multi-input multi-output (MIMO) channel of claim 1, wherein the quasi-continuous modulation in the modulating step comprises quasi-continuous OFDMA modulation and quasi-continuous CDMA modulation.

5. The method to transmit video over a multi-input multi-output (MIMO) channel of claim 1, wherein the video predictive coding is applied prior to the multi-dimensional transform or after the multi-dimensional transform.

6. The method to transmit video over a multi-input multi-output (MIMO) channel of claim 5, wherein the video predictive coding is applied prior to the multi-dimensional transform, and the decorrelating step comprises:
    applying the video predictive coding to the source video in a space-time domain, and generating pixel residuals for all pixels of the source video in the space-time domain; and
    transforming the pixel residuals of all pixels of the source video in the space-time domain to video residual coefficients in a transform-domain by the multi-dimensional transform.

7. The method to transmit video over a multi-input multi-output (MIMO) channel of claim 1, wherein the multi-dimensional transform is applied prior to the video predictive coding, and the decorrelating step comprises:
    applying the multi-dimensional transform to the source video, and transforming the source video into video coefficients in transform-domain; and
    applying video predictive coding in the transform-domain, and converting the video coefficients into the video residual coefficients.

8. The method to transmit video over a multi-input multi-output (MIMO) channel of claim 4, wherein, when the quasi-continuous OFDMA modulation is used, the mapping step comprises mapping from the lowest to the lowest and mapping from the lowest to the largest.

9. The method to transmit video over a multi-input multi-output (MIMO) channel of claim 8, wherein the mapping from the lowest to the lowest comprises:
    scanning the residual coefficients of all blocks in a region into a one-dimensional block coefficient array for each block;
    merging all one-dimensional block coefficient arrays in the region into a one-dimensional region coefficient array;
    starting from the lowest index of the region coefficient array, taking a pair of video residual coefficients to form a complex number, assigning the complex number to the transmission stream with the unassigned OFDM sub-carrier at the lowest temporal frequency, further assigning the complex number to the unassigned OFDM sub-carrier at the lowest temporal frequency, and the assigned complex number becoming the to-be-modulated signal value of the OFDM sub-carrier; and
    moving the index higher by two units to point to a next pair of transform-domain video residual coefficients, and continuing assigning until mapping is done for all the region coefficient arrays.

10. The method to transmit video over a multi-input multi-output (MIMO) channel of claim 8, wherein the mapping from the lowest to the largest comprises:
    scanning the residual coefficients of all blocks in a region into a one-dimensional block coefficient array for each block;
    merging all one-dimensional block coefficient arrays in the region into a one-dimensional region coefficient array;
    obtaining a channel matrix in frequency-domain for each sub-carrier;
    decomposing the channel matrix in frequency-domain for each sub-carrier by SVD (singular value decomposition) to obtain singular values, wherein each of which represents a singular sub-channel;
    ordering all singular sub-channels in an array according to sorting of the singular values of the singular sub-channels;
    assigning the transform-domain video residual coefficients in the region coefficient array to the singular sub-channels; and generating to-be-modulated signal values of each OFDM sub-carrier of each transmission stream by transmit beamforming from complex numbers formed from the transform-domain video residual coefficients assigned to the singular sub-channels.

11. The method to transmit video over a multi-input multi-output (MIMO) channel of claim 10, wherein the singular sub-channels are sorted in such an order that the singular value of a singular sub-channel at a lower index is greater than or equal to the singular value of a singular sub-channel at a higher index.

12. The method to transmit video over a multi-input multi-output (MIMO) channel of claim 10, wherein the assigning the transform-domain video residual coefficients to the singular sub-channels comprises:
    starting from the lowest index, taking a pair of video residual coefficients from the region coefficient array, and forming a complex number with one-to-one value mapping;
    assigning the complex number to the unassigned singular sub-channel with the lowest index; and
    moving the index higher by two units to point to next pair of video residual coefficients until assigning is done for all coefficients.

13. The method to transmit video over a multi-input multi-output (MIMO) channel of claim 10, wherein the transmit beamforming comprises: giving $x_{km}$ to denote the complex number of the $m^{th}$ singular sub-channel at the sub-carrier k, wherein k is the index of sub-carriers of an OFDM symbol, m is the number of the transmission streams and also the number of the to-be-modulated signal values at the sub-carrier k;
    making the m complex numbers of the generated to-be-modulated signal values at the sub-carrier k be denoted by column vector $Y_k$ of m rows, which is given in the following equation:

$$Y_k = \begin{bmatrix} y_{k1} \\ \vdots \\ y_{km} \end{bmatrix} = V_k \begin{bmatrix} x_{k1} \\ \vdots \\ x_{km} \end{bmatrix}$$

wherein $V_k$ is obtained by performing SVD on the frequency-domain channel matrix $H_k$ of the sub-carrier.

14. The method to transmit video over a multi-input multi-output (MIMO) channel of claim 4, wherein after the transform-domain video residual coefficients are mapped to different spreading codes or sequences in each transmission stream to generate quasi-continuous to-be-spread signal values in the mapping step, the quasi-continuous CDMA modulation in the modulating step comprises:
    arithmetically multiplying each signal value of each transmission stream with the spreading sequence and modulating the spreading sequence; and
    superimposing all modulated spreading sequences of each transmission stream together to form a plurality of transmission output signals.

15. The method to transmit video over a multi-input multi-output (MIMO) channel of claim 4, wherein, after the transform-domain video residual coefficients are mapped to different sub-carriers in each transmission stream and the quasi-continuous to-be-modulated signal values are generated in the mapping step, the quasi-continuous OFDMA modulation in the modulating step comprises:
    transforming each OFDM symbol of each transmission stream from the frequency-domain to the time-domain by IFFT; and
    cyclically extending each OFDM symbol with cyclic prefix, cyclic suffix or both to form a plurality of transmission output signals.

16. The method to transmit video over a multi-input multi-output (MIMO) channel of claim 1, wherein the linear normalization refers to multiplying the to-be-modulated signal values on video sub-carriers in all OFDM symbols or video spreading sequences in all CDMA spreading words by one scaling factor to make a certain characteristic value equal or close.

17. The method to transmit video over a multi-input multi-output (MIMO) channel of claim 16, wherein the scaling factor is determined by calculating an average power of each segment of transmission output signals and comparing the average power with a certain determined value.

18. The method to transmit video over a multi-input multi-output (MIMO) channel of claim 16, wherein the scaling factor is a scaling factor determined by finding out the peak value of each segment of transmission output signals and comparing the peak value with a certain determined value.

19. The method to transmit video over a multi-input multi-output (MIMO) channel of claim 16, wherein the normalization chooses different scaling factors to normalize different segments of each transmission output signals separately.

20. The method to transmit video over a multi-input multi-output (MIMO) channel of claim 16, wherein the normalization chooses the same scaling factor to normalize the segments at the same time-slots of all transmission output signals together; and chooses different scaling factors to normalize the segments at different time-slots of all transmission output signals separately.

21. The method to transmit video over a multi-input multi-output (MIMO) channel of claim 1, wherein in the modulation step, the normalization is applied to the to-be-modulated segments of transmission streams prior to the quasi-continuous modulation.

22. The method to transmit video over a multi-input multi-output (MIMO) channel of claim 1, wherein in the modulation step, the normalization is applied to the modulated segments of the transmission output signals after the quasi-continuous modulation.

23. The method to transmit video over a multi-input multi-output (MIMO) channel of claim 8, wherein in the mapping step, the value mapping method to map the video residual coefficients into complex numbers comprises:
    one-to-one value mapping wherein video residual coefficients a and b are used to form a complex number value a+jb, wherein j is a square root of −1; or
    two-to-one value mapping wherein video residual coefficients a, b, c, and d are used to form a complex number (a+bM)+j(c+dM), wherein j is a square root of −1, and M is a set real constant number.

* * * * *